United States Patent [19]

Kleemann

[11] Patent Number: 5,015,904
[45] Date of Patent: May 14, 1991

[54] STATOR FOR AN ELECTRICAL MACHINE

[75] Inventor: Dittmar Kleemann, Friedland, Fed. Rep. of Germany

[73] Assignee: Robert Bosch GmbH, Stuttgart, Fed. Rep. of Germany

[21] Appl. No.: 517,392

[22] Filed: Apr. 27, 1990

Related U.S. Application Data

[63] Continuation of Ser. No. 276,322, filed as PCTDE87/00198 on May 6, 1987, published as WO87/07452 on Dec. 3, 1987, abandoned.

[30] Foreign Application Priority Data

May 21, 1986 [DE] Fed. Rep. of Germany ....... 3617017

[51] Int. Cl.⁵ ............................................. H02K 3/00
[52] U.S. Cl. ..................................... 310/184; 310/45;
310/71; 310/179; 310/194; 310/214; 310/218;
310/258
[58] Field of Search ............... 310/218, 254, 258, 269,
310/271, 179, 180, 184, 190, 194, 214, 165, 42,
43, 45, 91, 71, 207, 208

[56] References Cited

U.S. PATENT DOCUMENTS

| | | | |
|---|---|---|---|
| 747,631 | 12/1903 | Osborne | 310/194 |
| 1,569,218 | 1/1926 | Dake | 310/258 |
| 1,571,613 | 2/1926 | Whitehorn | 310/250 UX |
| 2,235,075 | 3/1941 | Kimball | 310/184 |
| 4,471,247 | 9/1984 | Cotton | 310/218 |

FOREIGN PATENT DOCUMENTS

| | | |
|---|---|---|
| 0038495 | 10/1981 | European Pat. Off. . |
| 1231796 | 1/1967 | Fed. Rep. of Germany . |
| 2620532 | 11/1977 | Fed. Rep. of Germany ...... 310/269 |
| 0117437 | 7/1984 | Japan . |
| 1502554 | 3/1978 | United Kingdom . |
| 1602554 | 11/1981 | United Kingdom . |

OTHER PUBLICATIONS

Patent Abstract of Japan, vol. 8, No. 239, (E276) 2/11/84; Nippon-Denso.

Primary Examiner—R. Skudy
Attorney, Agent, or Firm—Michael J. Striker

[57] ABSTRACT

A multiple stator for an electrical machine includes an excitation winding (5) assembled of a plurality of compound coil members (6) each including a main winding element (8, 9) and a shunt winding element (7). All shunt winding elements (13–16) are made in a single winding operation from a continuous insulated wire (46) wound on winding formers (18–21) created by folding perforated parts of a band-shaped support (17) whereby openings matching the cross-section of respective poles result in the band material. The band-shaped support is provided with notches for anchoring the ends of respective winding elements. The support is arched to match the inner wall of a stator and inserted into the housing whereby chain-link shaped main winding elements (8, 9) surround the individual shunt winding elements. The poles are then inserted into the openings of the winding support and secured to the housing.

4 Claims, 4 Drawing Sheets

STATOR FOR AN ELECTRICAL MACHINE

This application is a continuation of application Ser. No. 276,322, filed as PCT DE87/00198 on May 6, 1987, published as WO87/07452 on Dec. 3, 1987, now abandoned.

BACKGROUND OF THE INVENTION

The invention relates to a multipole stator for an electrical machine which includes an excitation winding assembled of a plurality of compound coil members arranged around respective poles of the stator. Each coil member includes a main winding element and a shunt winding element. In such a four-pole stator, the four individual windings are in each case wound separately as four main windings and four shunt windings. One main winding and one shunt winding are then, in each case, assembled to form a combined winding member. The combined windings are held together by a winding tape, which is applied in most cases manually. In subsequent operations, the ends of the windings are connected to form an excitation winding. The ends are prepared by laying, insulating, combining and providing them with contact parts for the voltage connection before the combined windings are bent into shape adapted to an inside diameter of a pole housing. The ends are connected to form the excitation winding as a coil body. The connected joints must then still be insulated, and the excitation winding must be impregnated before it is mounted in the pole housing. Such an exciter winding has the disadvantage of not being able to be produced by an automated process and is, thus, too expensive, especially for mass production.

SUMMARY OF THE INVENTION

The object of the invention is a stator in which it is not only possible to produce a main winding of noninsulated flat wire but also a shunt winding of insulated round wire in an automated process so that the excitation winding is produced in an economic matter.

According to the invention, the individual windings of the shunt winding and their contact parts are arranged continuously on a common winding support formed from flat flexible insulating band-like material, for example a press board. For this purpose, the winding support is made of an endless band by cutting, stamping and folding, is provided with winding formers, winding wire supports, and attachment points for the contact parts and is constructed in such a manner that the shunt winding together with the winding support can be separately produced in an automated process. The main and the shunt windings are assembled one with the other only when forming the excitation winding in the pole housing.

It is particularly advantageous that the shunt winding is held, by baking, fixed in its position on the winding support of flat and flexible insulating band material, and the contact parts for the voltage connection are located on the winding support so that the winding ends can be attached there to them.

In addition, the winding support carrying the shunt winding and the contact parts can surround the main winding from outside or inside and can be arranged in the pole housing, correspondingly arched, resting against the inside wall of the pole housing or against the pole shoes. To this end, the winding formers for the shunt winding are folded in or out along perforated lines punched in the winding support.

BRIEF DESCRIPTION OF THE DRAWINGS

Additional features and advantages of the present invention will become more apparent from the description which follows with reference to appended drawings wherein.

DESCRIPTION OF THE PREFERRED EMBODIMENTS

Figure 1:
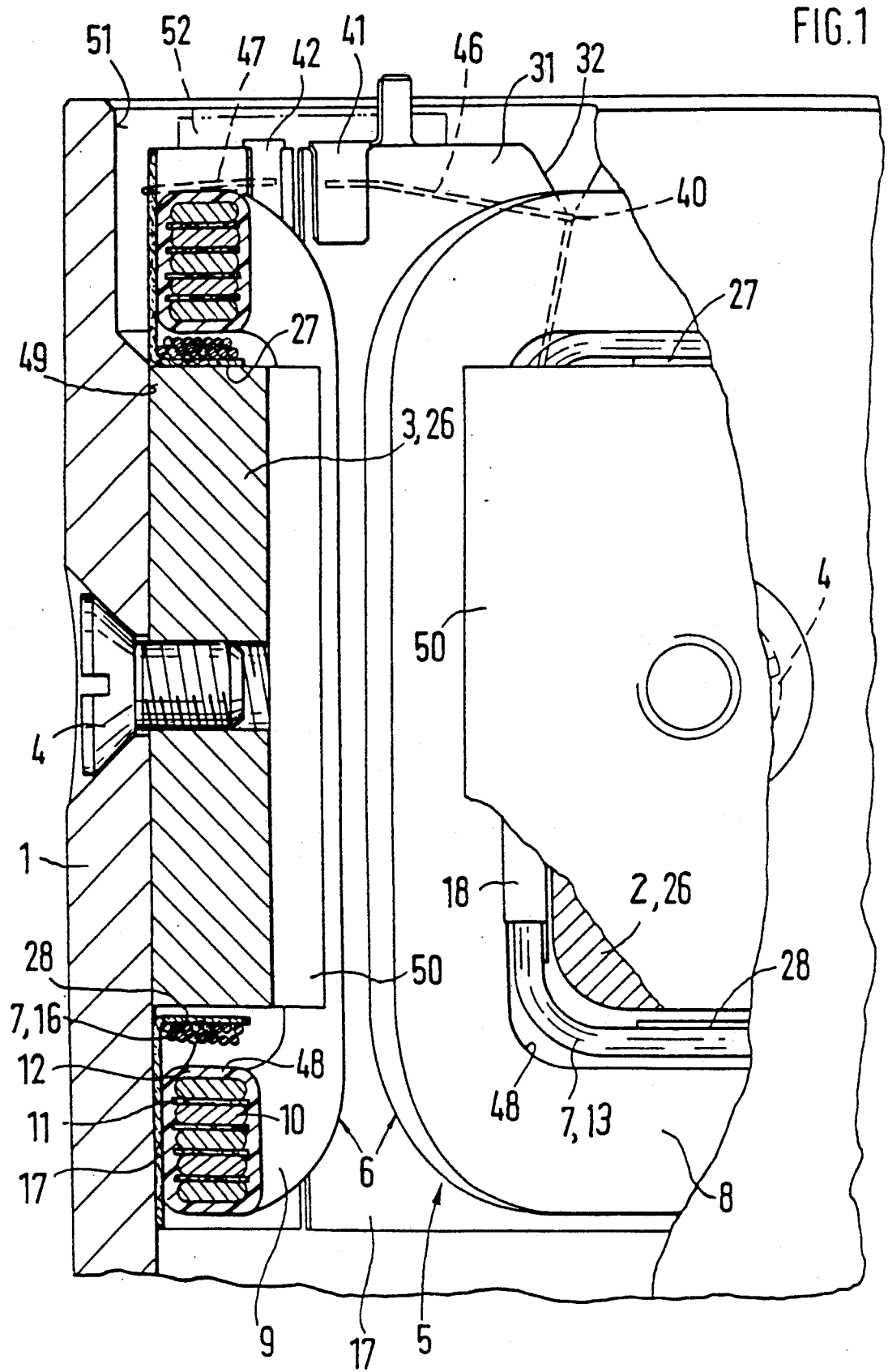
FIG. 1 shows a partial cross-sectional view of a first typical embodiment of a stator according to the present invention.
Figure 2:
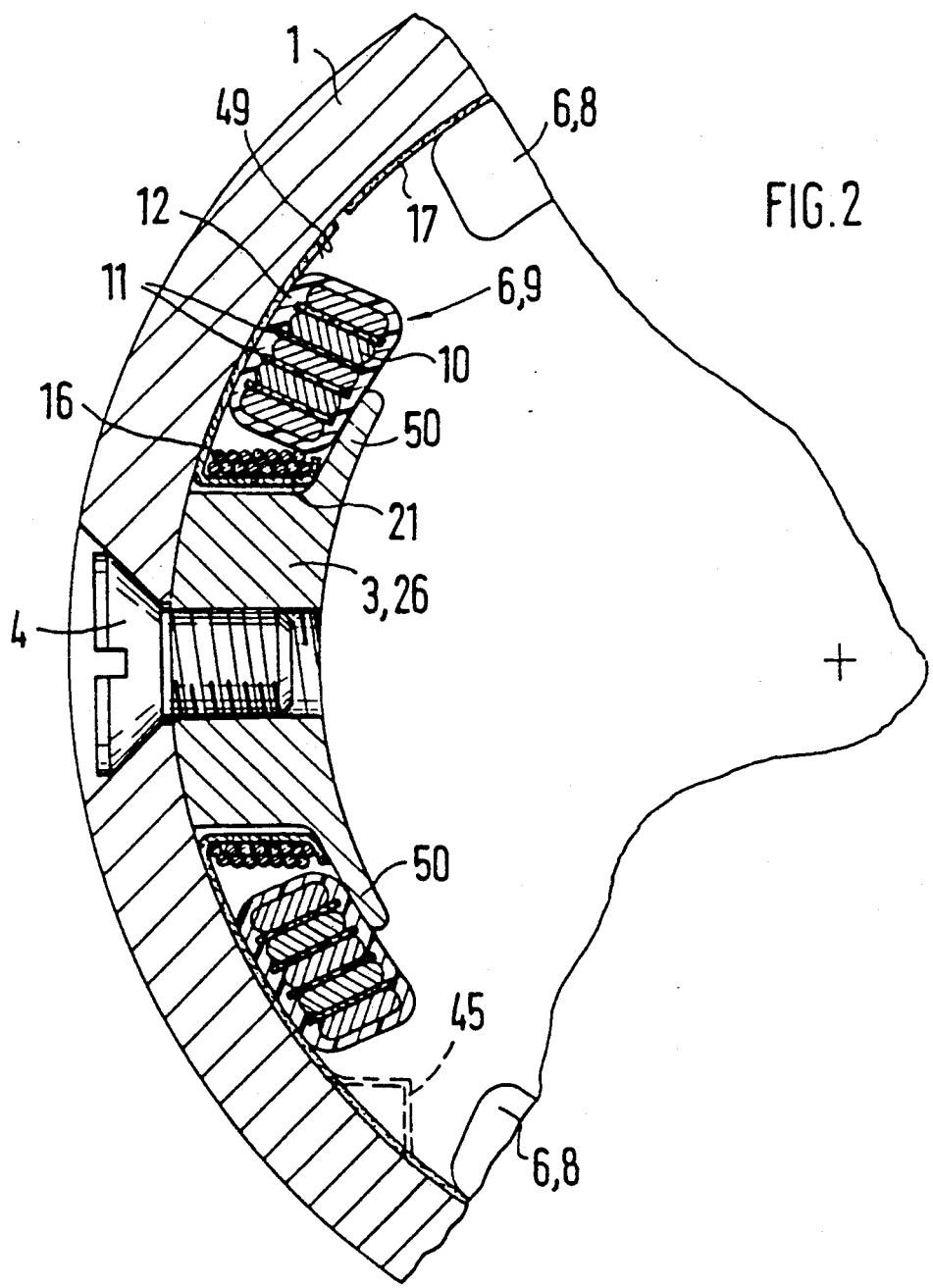
FIG. 2 shows a partial cross-sectional view of the stator according to FIG. 1.

A stator of an electrical machine has a pole housing 1 in which four poles, forming two pole pairs 2, 3, are mounted. The pole pairs 2 and 3 are mounted in the pole housing 1 by means of screws 4. The pole pairs 2 and 3 carry an excitation winding 5. The excitation winding 5 comprises a plurality of combined coil members 6 each including a main winding 6 and a shunt winding 7. In this example, the excitation winding 5 is formed of four main winding elements, two of which are shown in the drawing and are designated by 8 and 9. The main winding elements 8, 9 of the coil members 6 are wound from non-insulated flat wire 10 in a manner known per se. in this arrangement, the individual flat wires 10 are insulated from one another by interposition of, for example, a paper strip 11 which is placed into position during the winding. The individual main winding elements 8,9 are arched in a manner also known per se, connected to form a coil series, and sheathed with an insulation 12 which surrounds the entire main winding elements 8 or 9 and which is formed, for example, by spraying or immersion. It is only the ends of the coil members 6 used for the voltage connection which protrude from the insulation 12. An automated process known per se is used for producing the coil members 6.

Figure 3:
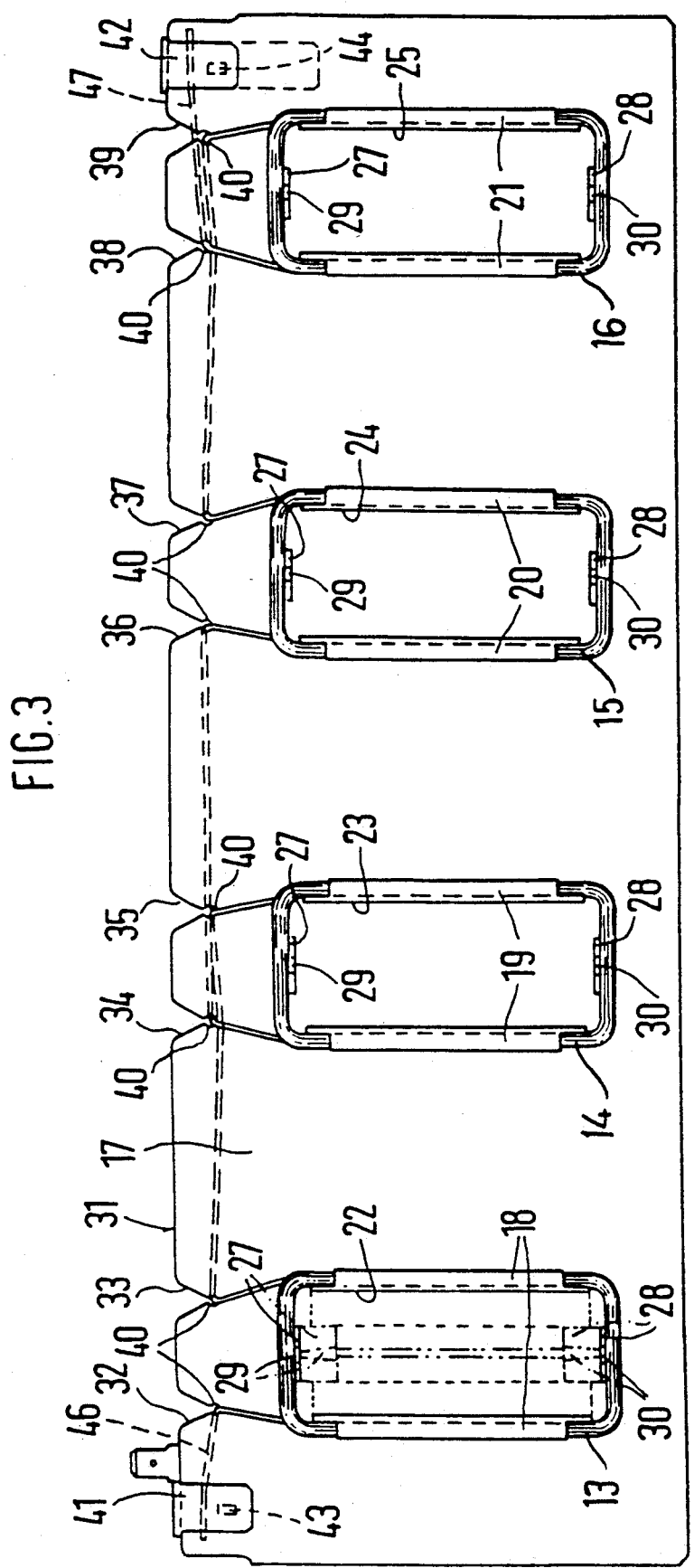
FIG. 3 shows a side view of a flat winding support with shunt winding and contact parts.
Figure 4:
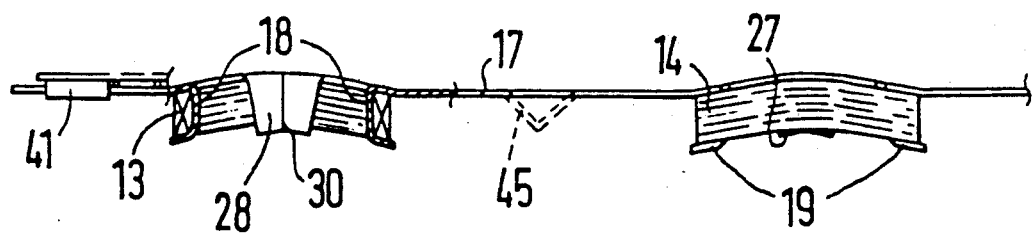
FIG. 4 shows a top view of a part of the winding support with arched winding chambers.

The shunt winding 7 also consists of four shunt winding elements 13 to 16 which are formed of insulated wire with a circular cross section which is continuously wound onto winding formers 18–21 integrally connected with a winding support 17. The winding support 17 is formed of flat flexible heat-resistant and insulating band-like material, for example, of press board, which can be provided with an adhesive coating. The winding support 17 is cut, stamped and folded in continuous production from the insulating band material. In this process, each winding former 18 to 21 is produced by folding parts of the winding support along punched or perforated lines indicted by dashes at the former 18 in FIG. 3. The resulting rectangular openings or windows 22 to 25 correspond to the form of a yoke 26 of the pole pairs 2 and 3. Each winding former 18 to 21 is folded to form U-shaped receptacles at the longitudinal sides of the windows 22 to 25. On each transverse side of the windows 22 to 25, a tab 27 or 28 is folded at a right angle to the winding support 17. The tabs 27 and 28 are provided with slots 29 and 30, respectively, which widen in a wedge shape towards free ends of the tabs 27 and 28.

On a longitudinal edge 31 of the winding support 17, wedge-shaped notches 32 to 39 are cut out to act as anchoring points for the insulated wire of shunt winding 7. The anchoring points notches 32 to 39 form at their base 40 a circular mouth. The mouth of the base 40 matches the diameter of the insulated winding wire. The anchoring points of the notches 32 to 39 are allocated in pairs to the winding formers 18 to 21 to accommodate the beginning and the end of the respective shunt winding elements 13 to 16 in a guiding and supporting manner. At the ends of the winding support 17, a position fixing depressed portion 43 and 44 is formed on the winding support 17 for contact tabs 41 and 42 respectively. It can have the shape of, for example, a hole, or of a detent nose, or of a recess. The contact tab 41 is constructed as positive contact tab, and the contact tab 42 is constructed as negative contact tab.

In the winding support 17, folds 45 can also be formed which extend transversely across the winding support 17. They are used for compensating production tolerances which occur mainly in the circumferential direction of pole housing 1 and chain-shaped arrangement of coil members 6 with respect to the spacing of windows 22 to 25 and winding formers 18 to 21 of the winding support 17.

The insulated wire of shunt winding 7 is continuously wound on the winding formers 18 to 21 of the winding support 17. The beginning and the end of each winding element 13 to 16 pass through the associated pair of anchoring or support points in notches 32 to 39. The beginning 46 of the shunt winding 7 is then welded to the positive contact tab 41, and the end 47 of the shunt winding 7 is welded to the negative contact tab 42. The shunt winding elements 13 to 16 are subsequently fixed in their position in the winding formers 18 to 21 and at the tabs 27 and 28 by baking or bonding. The insulated winding wire is sealed in the anchoring points of the notches 32 to 39. The winding support 17 is subsequently arched in accordance with the inside diameter of the pole housing 1 in the area of the winding formers 18 to 21 including shunt winding elements 13 to 16. During this arching process, the wedge-shaped slots 29 and 30 of the tabs 27 and 28 are closed. The shunt winding 7 is thus applied to the side of the winding support 17 facing the centre of the arch and is provided with the contact tabs 41,42 for connecting the voltage. The winding support 17 provides the possibility of separately producing the shunt winding 7 in an automated process.

To mount the excitation winding 5 in the pole housing 1, the winding support 17 is arched around the assembly of coil members 6 constructed as coil chain. In the resulting arrangement, the winding formers 18 to 21 together with the winding elements 13 to 16 protrude into the central openings or windows 48 of the main winding elements 8,9 of the coil members 6 so that the assembly of members 6 surrounds the shunt winding 7 and rests with its outside circumference against the arched winding support 17. The excitation winding 5 is then pushed into the pole housing 1. The poles of the pole pairs 2,3 are pushed from inside the assembly of the coil members 6 through the associated windows 22 to 25 of the winding support 17 and screwed to the inside wall 49 of the pole housing 1 with screws 4. The winding support 17 then rests with its outside circumference against the inside wall 49 of the pole housing 1. The free U-leg of the winding formers 18 to 21 and the inside of the coil members 6 rest against the back of the pole tabs or shoes 50 of the pole pairs 2,3. As protection against any current leakage between the positive contact tab 41 and the pole housing 1, the inside wall 49 is widened in the region of poles 2 and 3 to provide a free space at the connection-side end 51 of the pole housing 1. An insulating strip 52 can be additionally arranged in the free space for positive contact tab 41 at the housing end 51.

Figure 5:
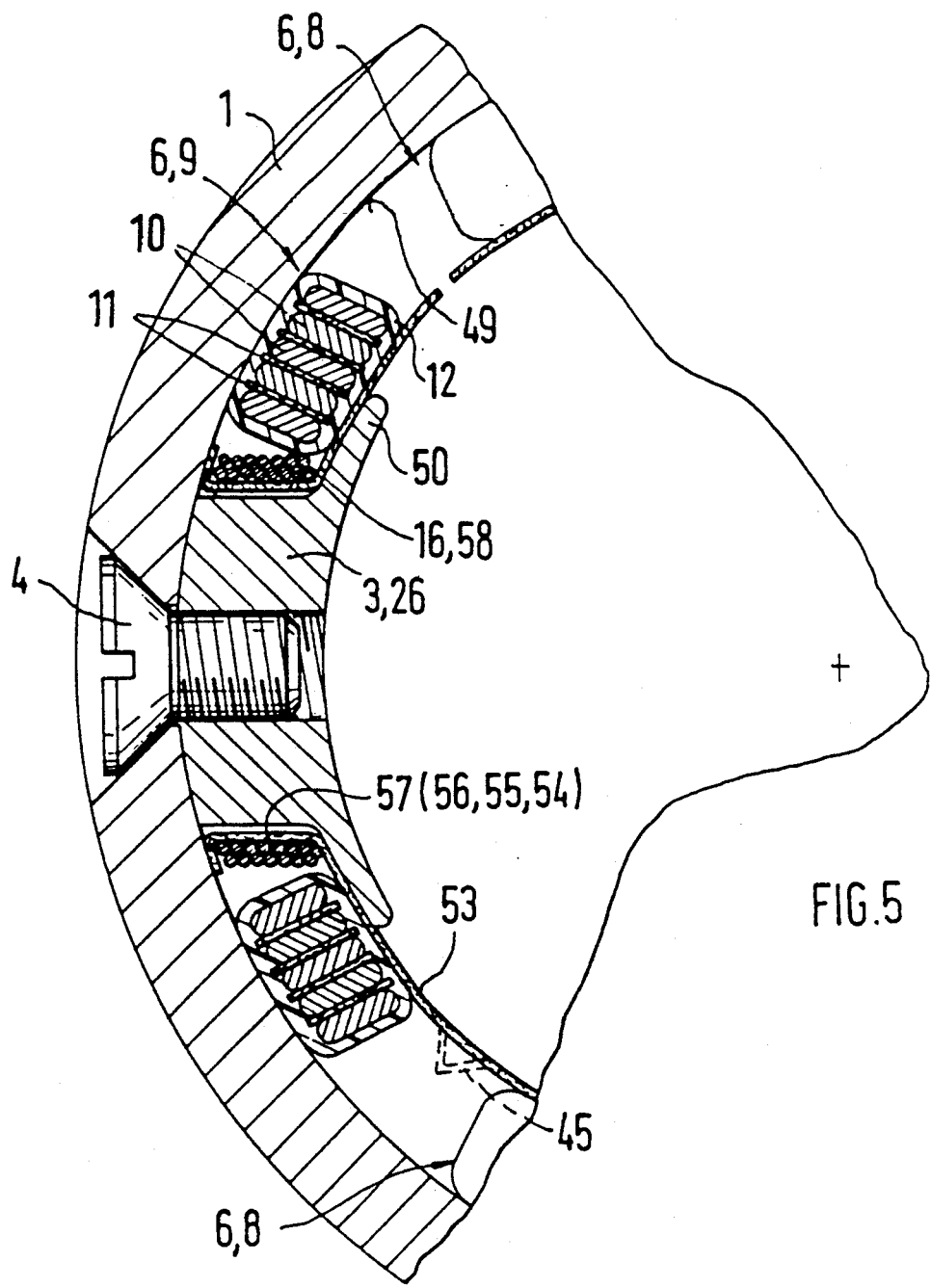
FIG. 5 shows a partial cross-sectional view of a part of a second typical embodiment of the stator.

A second typical embodiment of a stator according to the invention is shown in FIG. 5. Where the parts are identical to those of the first embodiment, they are designated by the same reference numbers.

A winding support 53 is formed, like the winding support 17, from a flat flexible insulating and heat-resistant band material, for example a press board. This is again done in an automated process by cutting, stamping, folding of the band material. Only the winding formers 54 to 57 and the slotted tabs, not shown, which correspond to tabs 27 and 28 of the first embodiment, are folded towards the side of the winding support 53 facing away from the later arch centre. After the insulated round wire of the shunt winding 58 has been continuously wound onto the formers of the winding support 53, after beginning 46 and 47 of the shunt winding 53 have been welded to the same contact tabs 41 and 42 as in the first embodiment, and after the shunt winding 58 has been baked, or bonded, or sealed to the winding support 53, the winding support 53 is arched. In this embodiment, the shunt winding 58 is located at the side of the winding support 53 facing away from the arch centre. The winding support 53 and shunt winding 58 are inserted, like the poles 2,3 from inside the automatically produced coil series of the coil members 6 into the windows 48 of the main winding elements 8 and 9. The main winding elements 8 and 9 of the coil members 6 then frame the winding elements 13 to 16 of the shunt winding 58. The inner side of the coil members 6 thus rests against the outer side of the winding support 53. The excitation winding 5 assembled from the coil members 6 including the main elements 8,9 and shunt winding elements 8,9 and 58 is then pushed into the pole housing 1. The poles of the pole pairs 2 and 3 are again pushed through the associated windows 22 to 25 of the winding support 53 and screwed to the inside wall 49 of the pole housing 1 by the screws 4. The winding support 53 then rests with its outside circumference against the pole tabs 5 of the pole pairs 2 and 3. The free U-leg of the winding formers 54 to 57 and the outer side of the coil members 6 rest against the inside wall 49 of the pole housing 1.

The winding support 53 requires less band material because of the smaller arch diameter than that of the winding support 17. in addition, the shunt winding 58 accommodated in the assembly of the coil members 6 can facilitate the mounting of the excitation winding 5 in the pole housing 1.

I claim:
1. A multipole stator for an electric machine having a stator housing, a plurality of poles disconnectably attached to an inner side of the stator housing and a compound excitation winding, said excitation winding comprising a series of main winding elements each having a central opening, and a series of shunt winding elements arranged in said central openings; all shunt winding elements being wound from a continuous insulated wire onto assigned winding formers integrally connected with a band-shaped support of a flexible insulating material; each of said winding formers surrounding an opening in said band-shaped support; a longitudinal edge of said band-shaped support being formed with a plurality of wedge-shaped notches for anchoring said continuous insulated wire between respective shunt winding elements; two contact tabs attached to end portions of said longitudinal edge to provide connections to a negative and positive voltage respectively, ends of said continuous insulated wire being welded to said contact tabs; said band-shaped support being arched and arranged in said stator housing; and said poles passing through assigned openings in said band-shaped support.

2. A stator according to claim 1 wherein said band-shaped support has at least one fold for compensating manufacturing tolerances in a circumferential direction of the stator housing.

3. A stator according to claim 1 wherein said poles are provided with pole shoes, said bandshaped support resting on said inner side of said stator housing, a lower side of said pole shoes engaging said main winding elements and pressing the same against said bandshaped support.

4. A stator according to claim 1 wherein said poles are provided with pole shoes, said main winding elements resting on said inner side of said stator housing, and said band-shaped support being clamped between said main winding elements and a lower side of said pole shoes.

* * * * *